United States Patent
Bellato et al.

(10) Patent No.: US 9,621,410 B2
(45) Date of Patent: Apr. 11, 2017

(54) METHOD OF LOCALIZING A FAILURE OCCURRING ALONG A TRANSMISSION PATH

(75) Inventors: Alberto Bellato, Bernareggio (IT); Pietro Grandi, Milan (IT)

(73) Assignee: Alcatel Lucent, Boulogne-Billancourt (FR)

( * ) Notice: Subject to any disclaimer, the term of this patent is extended or adjusted under 35 U.S.C. 154(b) by 731 days.

(21) Appl. No.: 13/509,650

(22) PCT Filed: Dec. 17, 2010

(86) PCT No.: PCT/EP2010/070034
§ 371 (c)(1),
(2), (4) Date: Jun. 21, 2012

(87) PCT Pub. No.: WO2011/073374
PCT Pub. Date: Jun. 23, 2011

(65) Prior Publication Data
US 2013/0135991 A1 May 30, 2013

(30) Foreign Application Priority Data

Dec. 18, 2009 (EP) ..................................... 09306265

(51) Int. Cl.
H04L 12/24 (2006.01)

(52) U.S. Cl.
CPC ...... H04L 41/0668 (2013.01); H04L 41/0677 (2013.01)

(58) Field of Classification Search
None
See application file for complete search history.

(56) References Cited

U.S. PATENT DOCUMENTS 7,032,032 B2 * 4/2006 Loprieno ...................... 370/393
8,169,917 B2 * 5/2012 Chun et al. ................... 370/241
(Continued)

FOREIGN PATENT DOCUMENTS

| CN | 101009518 | 8/2007 |
| EP | 1422968 | 5/2004 |

(Continued)

OTHER PUBLICATIONS

Maarten, Vissers; Draft revised G.709; Version 3.3, document : CDO5R1; online; Aug. 17, 2009; XP002574460; ITU-T Study Group 15; Question 11 WP 3; Retrieved from the internet: URL:http://www.itu.int/ITU-T/studygroups/com15/index.asp; retrieved on Mar. 22, 2010.

(Continued)

*Primary Examiner* — Chirag Shah
*Assistant Examiner* — Joshua Smith
(74) *Attorney, Agent, or Firm* — Patti & Malvone Law Group, LLC

(57) ABSTRACT

A method of localizing failures occurring along a transmission path is provided. A data signal is transmitted along the transmission path, which comprises a path segment. A first network node performs a tandem connection monitoring source function of a tandem connection. A second network node monitors the transmission along the path segment, by performing a tandem connection monitoring sink function. When the first network node detects a failure of the data signal, the first network node enters information indicating a data signal failure into the data signal's overhead field. When the second network node detects a failure by the tandem connection monitory sink function, the second network node enters information into the overhead field. When a third network node detects a failure of the data signal, the third network node uses the information in the overhead field to determine whether the failure occurred within or outside of the path segment.

4 Claims, 10 Drawing Sheets

(56) References Cited

U.S. PATENT DOCUMENTS

| | | | |
|---|---|---|---|
| 8,189,485 B2* | 5/2012 | Yan | 370/241 |
| 2003/0097472 A1 | 5/2003 | Brissette | |
| 2004/0184489 A1 | 9/2004 | Brissette | |
| 2005/0013296 A1* | 1/2005 | Imazeki et al. | 370/389 |
| 2005/0078607 A1* | 4/2005 | Bellato et al. | 370/248 |
| 2005/0086555 A1 | 4/2005 | Langridge | |
| 2006/0002293 A1* | 1/2006 | Huck et al. | 370/228 |
| 2006/0126503 A1* | 6/2006 | Huck et al. | 370/225 |
| 2007/0036080 A1* | 2/2007 | Addeo et al. | 370/389 |
| 2008/0134003 A1 | 6/2008 | Chun et al. | |
| 2008/0212961 A1* | 9/2008 | Zhang | 370/242 |
| 2008/0279548 A1 | 11/2008 | Yan | |
| 2010/0208583 A1* | 8/2010 | Liou et al. | 370/225 |

FOREIGN PATENT DOCUMENTS

| | | |
|---|---|---|
| EP | 1981211 | 10/2008 |
| JP | 2002353912 | 12/2002 |

OTHER PUBLICATIONS

ITU-T; Characteristics of Optical Network Hierarchy Equipment Functional Blocks G.798; Recommendation G.798, Online; Dec. 1, 2006; XP002574459; Retrieved from Internet: URL:http://www.itu.int/rec/T-Rec-G.798-200612-I; retrieved on Mar. 22, 2010.

* cited by examiner

Fig. 6

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Row # 1 | Frame alignment overhead | | | | | | | OTUk overhead | | | | | | | OPUk overhead | |
| 2 | RES | | TCM ACT | TCM6 | | | TCM5 | | | TCM4 | | FTFL | | |
| 3 | TCM3 | | TCM2 | | | TCM1 | | | PM | | EXP | | | |
| 4 | GCC1 | | GCC2 | | APS / PCC | | | | | RES | | | | | |

OTU-OH / ODU-OH

G.709 / Y.1331_F15-12

METHOD OF LOCALIZING A FAILURE OCCURRING ALONG A TRANSMISSION PATH

FIELD OF THE INVENTION

The invention relates to a method of localizing a failure occurring along a transmission path.

BACKGROUND

When transmitting a data signal along a transmission path, a failure of a network resource may result in a failure of the transmission of the data signal. The transmission path may contain different segments. For different reasons, it is useful to know within which segment a failure occurred.

SUMMARY

A method of localizing a failure occurring along a transmission path is proposed.

A data signal, which contains an overhead, is transmitted along the transmission path. The transmission path comprises a path segment.

A first network node is located at the beginning of the path segment. The first network node performs a tandem connection monitoring source function of a tandem connection.

A second network node is located at the end of the path segment. The second network node monitors the transmission along the path segment, by performing a tandem connection monitoring sink function, which corresponds to the tandem connection monitoring source function of the first network node.

In the case, that the first network node detects that a failure of the data signal occurs before the path segment, the first network node enters information indicating a data signal failure into the overhead field of the overhead.

In the case, that the second network node detects a failure of the tandem connection, by performing the tandem connection monitory sink function, the second network node enters information indicating a tandem connection failure into the overhead field.

A third network node is located after the path segment at the transmission path. In the case, that the third network node detects that a transmission failure of the data signal occurs along the transmission path, the third network node uses the information that is contained in the overhead field for determining whether the detected failure occurred within the path segment or whether the detected failure occurred outside of the path segment.

BRIEF DESCRIPTION OF THE DRAWINGS

FIG. 6 shows a data signal according to a known telecommunication standard.

DESCRIPTION OF EMBODIMENTS

Figure 1:
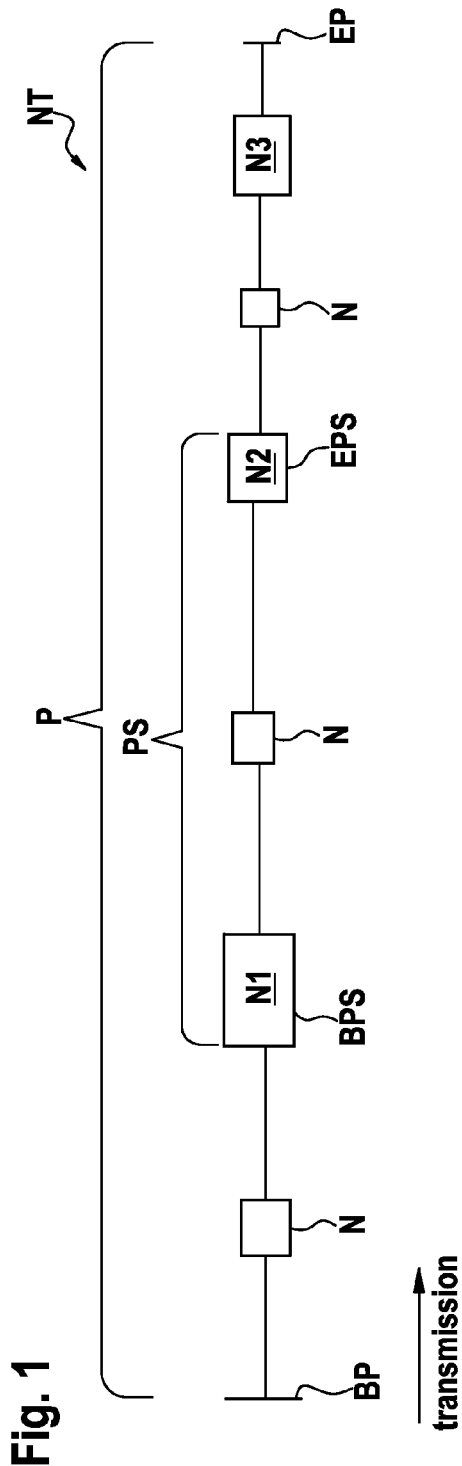
FIG. 1 shows network nodes located along a transmission path.

FIG. 1 shows network nodes of a network NT that are located along a transmission path P. The transmission path P contains a path segment PS. As shown in FIG. 1, the transmission is performed from left to right. At the beginning BPS of the path segment PS, a network node N1 is located. At the end EPS of the path segment PS another network node N2 is located. A further network node N3 is located along the transmission path P behind the path segment PS.

Further network nodes N are located along the transmission path P. These network nodes N monitor a transmitted data signal and generate an alarm signal in the case that a failure of the transmitted data signal occurs. Once a network node N generates an alarm signal, this alarm signal is then passed on until the end of the path P by the following network nodes.

Figure 2:
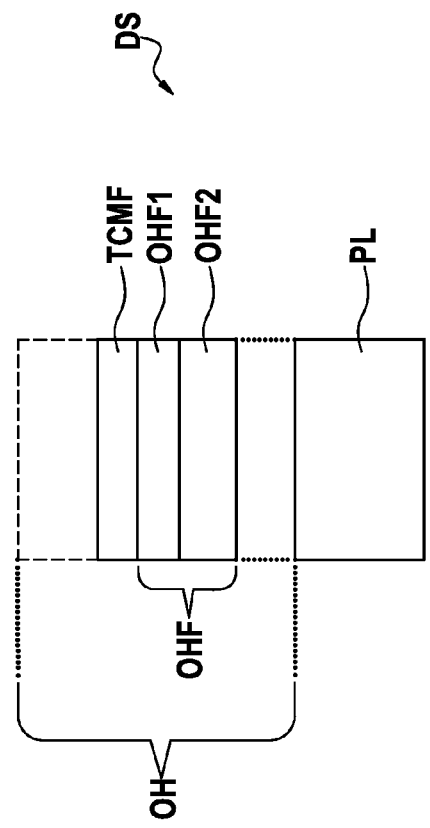
FIG. 2 shows a data field comprising an overhead payload.

FIG. 2 shows the general frame structure of the data signal DS which is transmitted along the transmission path. The data signal DS comprises a payload PL as well as an overhead OH. The overhead OH contains a tandem connection monitoring field TCMF for carrying parity information of a tandem connection monitoring layer. Furthermore, the overhead OH contains an overhead field OHF. The overhead field OHF contains a first overhead subfield OHF1 and a second overhead subfield OHF2.

Coming back to FIG. 1, it is now explained in which way the data signal is transmitted along the transmission path P.

Starting on the left hand side, at the beginning BP of the path P, the data signal is transmitted towards the right hand side to the end EP of the transmission path P. The network nodes N, N1, N2, N3 receive the data signal and pass it on to their next neighboring network node.

The network node N1 performs a tandem connection monitoring source function of a tandem connection monitoring layer. The network node N1 does so, by computing parity information over the payload of the data signal, and writing this parity information into the tandem connection monitoring field TCMF of the overhead OH as shown in FIG. 2. According to an alternative solution, the network node N1 writes the computed parity information into a tandem connection field of a frame of the data signal, which is sent by the network node N1 at a later point of time.

The network node N2 receives the data signal DS. Furthermore, the network node N2 monitors the transmission along the path segment PS, by performing a tandem connection monitoring sink function. The network node N2 does so, by computing parity information over the payload PL of the received data signal DS, and comparing the computed parity information with parity information which is contained within the tandem connection monitoring field TCMF of the data signal DS. In the case, that a failure occurred along the path segment PS, the payload PL is modified such that a parity information computed at the network node N2 would not be equal anymore to a party information contained within the tandem connection monitoring TCMF. Thus, the network node N2 is able to detect a transmission failure occurring along the path segment PS.

According to an alternative solution, the network node N2 compares a computed parity information with parity information contained within a tandem connection monitoring field of a data signal which is received at a later point of time.

The tandem connection monitoring field TCMF of the data signal DS is a field that is assigned to the tandem connection monitoring layer which observes the transmission of the data signal along the path segment PS. According to an alternative solution, the data signal DS contains multiple fields for carrying parity information of multiple tandem connection monitoring layers, wherein each of the fields is assigned to an individual tandem connection monitoring layer used for monitoring transmission along an individual path segment.

In the case, that the network node N1 detects that a failure of the data signal occurs before the path segment PS, the network node N1 enters information indicating a data signal failure into the overhead subfield OHF1. The network node N1 detects a failure of the data signal, either by receiving an alarm signal that is generated by a network node N located at the transmission path P before the path segment PS. Furthermore, the network node monitors a received data signal and derives from the received data signal itself, or from an absence of the data signal, that a failure of the date signal has occurred.

The network node N2 terminates the tandem connection monitoring layer function that is performed along the path segment PS. In the case, that a parity information computed by the network node N2 over the payload PL of the data signal DS is not equal to a parity information contained within the tandem connection monitoring field TCMF of the data signal, the network node N2 derives that a failure of the tandem connection monitoring layer function is present. According to an alternative solution, the network node N2 derives also from a certain bit pattern contained in the tandem connection monitoring field TCMF of the data signal DS, that an alarm signal has been generated by a network node N located before the network node N2 along the path segment PS. Also in this case, due to the reception of the alarm signal, the network node N2 concludes that a failure of the tandem connection monitoring layer function of the path segment PS is present.

In the case, that a failure of the tandem connection monitoring layer function performed along the path segment PS is detected by the network node N2, the network node N2 enters information indicating a tandem connection failure into the overhead subfield OHF2.

The network node N3 monitors the data signal, which is received by the network node N3, and carries out functions for detecting a failure of the data signal. In the case, that the network node N3 detects a failure of the data signal, the network node N3 uses the information contained within the overhead field OHF for determining whether the detected failure occurred within the path segment PS or outside of the path segment PS. By doing so, the network node N3 is able to determine, whether a network resource has failed within the path segment PS or outside of the path segment PS. Thus, the network node N3 is able to derive whether protection and/or restoration actions have to be initiated within the path segment PS or outside of the path segment PS.

In the case that the overhead subfield OHF1 contains information that indicates no data signal failure, the network node N3 derives from this that no data signal failure occurred before the path segment PS. Furthermore, in the case that the overhead subfield OHF2 contains information indicating a tandem connection failure, the network node N3 derives from this that a detected failure is caused by a failure that occurred along the path segment PS.

Figure 3:
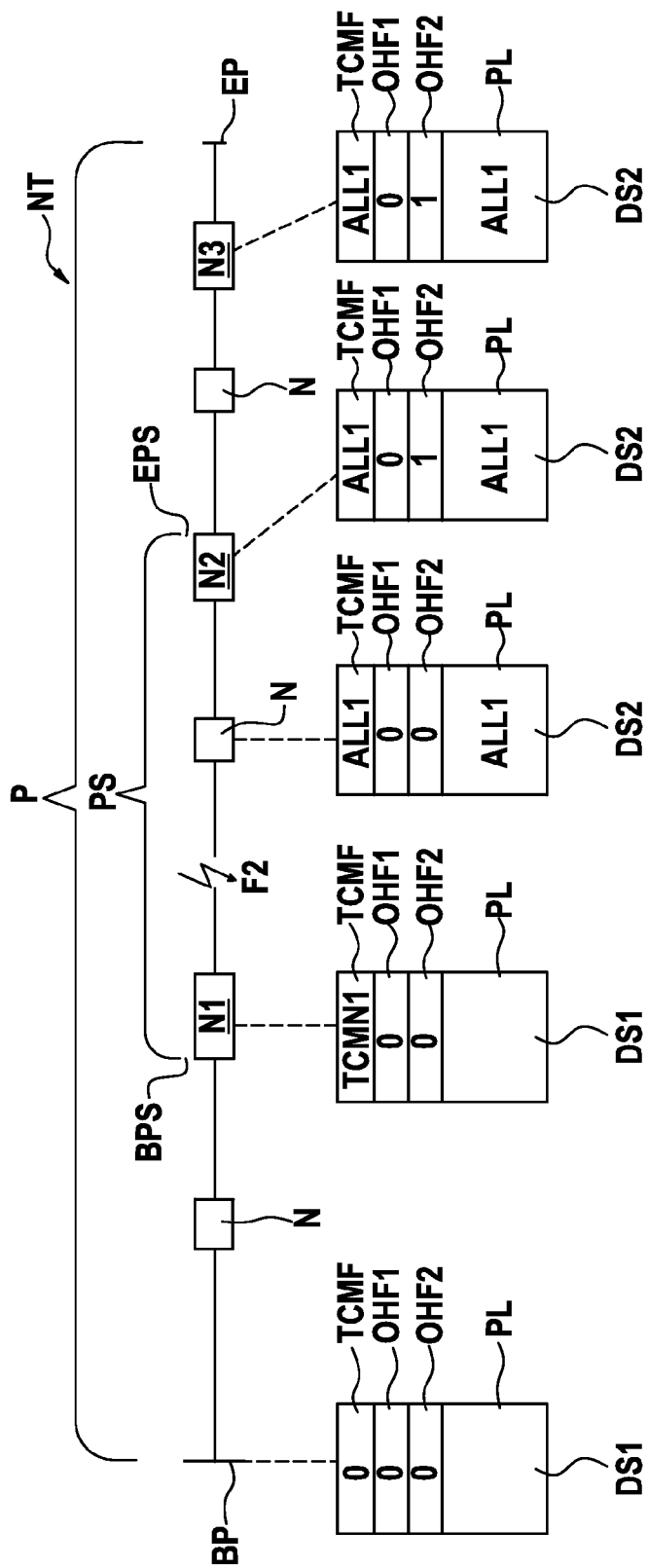
FIG. 3 shows the network nodes located along the transmission path and data signals in the case of a failure occurring along a path segment.

FIG. 3 shows the network NT together with the network nodes placed along the transmission path P and the path segment PS as already shown in FIG. 1.

Furthermore, FIG. 3 shows a failure F2 that occurs at the path segment PS at a location which is located between network node N1 and a network node N placed within the path segment PS.

Furthermore, FIG. 3 shows data signals DS1, DS2 at different stages of the transmission path P.

At the beginning of the transmission of the data signal DS1, the information that is present within the overhead fields OHF1, OHF2 is set to the value 0. A value of 0 indicates that no failure has occurred.

The network node N, which is located between the beginning BP of the path and the first network node N1, monitors the data signal DS1. Since no failure of the data signal DS1 is detected by the network node N, the node N does not generate an alarm signal.

The network node N1 monitors the data signal DS1 and also checks whether an alarm signal is received. Since the data signal DS1 has no failure at this stage, and since also no alarm signal has been received by network node N1, the network node N1 does not modify the information contained in the overhead subfield OHF1. Furthermore, the network node N1 generates parity information TCMN1 that is inserted into the tandem connection monitoring field TCMF.

Within the path segment PS a failure F2 occurs. At a network node N, which is located behind the location at which the failure F2 occurs, the failure F2 is detected. Therefore, the network node N generates an alarm signal called Alarm Indicating Signal (AIS), that is propagated along the transmission path P. The originally transmitted data signal DS1 is replaced by a data signal DS2 carrying the alarm signal. The payload PL of the data signal DS2 contains only ones ALL1 in its bit pattern. Furthermore, the overhead OH of the data signal DS contains in the tandem connection monitoring field TCMF only ones ALL1 as its bit pattern. The overhead subfields OHF1, OHF2 of the data signal D2 contain zeros.

The network node N2 receives the data signal DS2 and derives from the bit pattern ALL1 within the tandem connection monitoring field TCMF that the data signal DS2 carries an alarm signal that was generated within the path segment PS. Thus, the network node N2 concludes that a failure of the tandem connection monitoring layer function of the path segment PS has occurred. Therefore, the network node N2 enters into the overhead subfield OHF2 information that indicates a failure of a tandem connection. This information is provided in the form of a bit pattern "01", representing a one, entered into the overhead subfield OHF2. The network node N2 then transmits the data signal DS2 further on.

The network node N3 receives the data signal DS2. The network node N3 derives from the fact that the payload PL of the received data signal DS contains only ones ALL1, that the received data signal is an alarm signal. Thus, the network node N3 derives that a transmission failure has occurred along the transmission path P.

The network node N3 considers the information provided by the overhead subfields OHF1, OHF2. Since this information indicates that no data signal failure has occurred before the path segment PS, but that a tandem connection failure has occurred within the path segment PS, the network node N3 concludes that the detected failure has occurred within the path segment PS.

Figure 4:
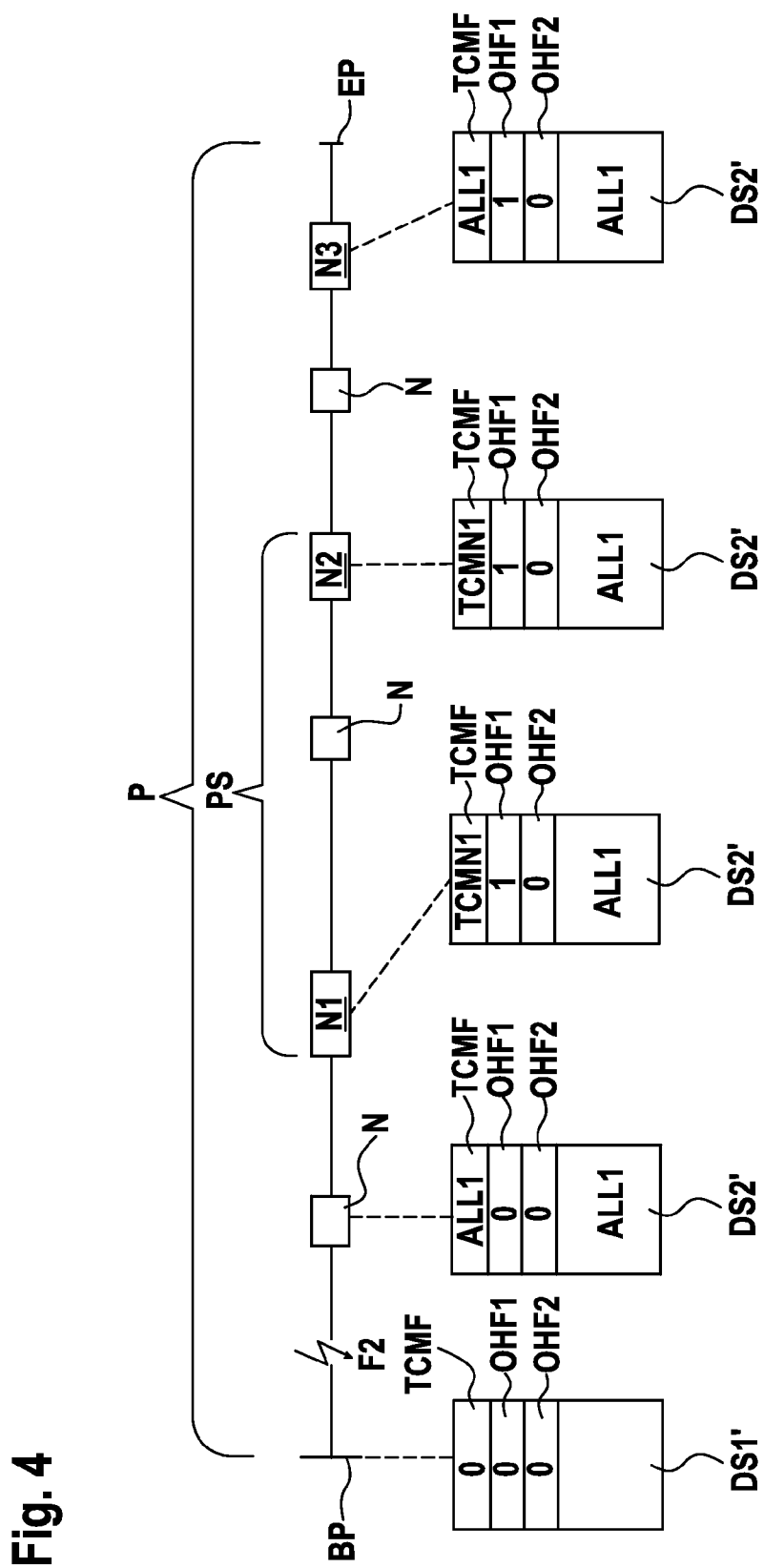
FIG. 4 shows the network node located and data signals in the case of a failure occurring outside of the path segment of the transmission path.

FIG. 4 shows the network NT together with the network nodes located along the transmission path P and the path segment PS as already shown in FIG. 1.

Furthermore, FIG. 4 shows a failure F1 occurring before the path segment PS and also before a network node N, which is located before the path segment PS.

Furthermore, the FIG. 4 shows transmitted data signals DS1', DS2' at the different stages of the network.

At the beginning of the transmission path P, the overhead subfields OHF1 and OHF2 contain bit patterns consisting of only zeros.

A network node N is placed along the transmission path P before the path segment PS. Between this network node N and the beginning BP of the transmission path P, a failure F1 occurs. This failure F1 is detected by the network node N, which therefore replaces the original data signal DS1' by a data signal DS2' carrying an alarm signal. The data signal DS2' is of the same structure as the data signal DS2 previously described.

At the beginning BPS of the path segment PS, the network node N1 receives the data signal DS2'. By analyzing the bit pattern contained in the payload PL of the data signal DS2', the network node N1 derives that an alarm signal is received. Therefore, the network node N1 concludes that a failure of the data signal DS1' is present. Thus, the network node N1 enters into the overhead subfield OHF1 information indicating a data signal failure. This information is provided in the form of a bit pattern "01", representing a one, entered into the overhead subfield OHF1. Furthermore, the network node N1 generates parity information TCMN1, that is computed over the payload PL of the data signal DS2', and enters this information into the tandem connection monitoring field TCMF of the data signal DS2'.

At the end EPS of the path segment PS, the network node N2 receives the data signal DS2'. The network node N2 calculates over the payload PL of the data signal DS2' parity information and compares this calculated parity information with the parity information TCMN1 given in the tandem connection monitoring field TCMF of the data signal DS2'. Since no failure occurred along the path segment PS, the calculated parity information matches the parity information TCMN1 given in the tandem connection monitoring field TCMF. Therefore, the network node N2 concludes that no failure of the tandem connection along the path segment PS is present. Therefore, the network node N2 does not modify the information within the overhead subfield OHF2 of the overhead OH.

The network node N3 receives the data signal DS2' and derives from fact that the payload PL of the received signal DS2' contains only ones, that an alarm signal is received and that a failure along the transmission path P has occurred.

The network node N3 considers the information given in the overhead subfields OHF1, OHF2. Since the overhead subfield OHF1 indicates a data signal failure, and since the overhead subfield OHF2 indicates that no tandem connection failure has occurred, the network node N3 concludes that the detected failure has occurred outside of the path segment PS.

Figure 5:
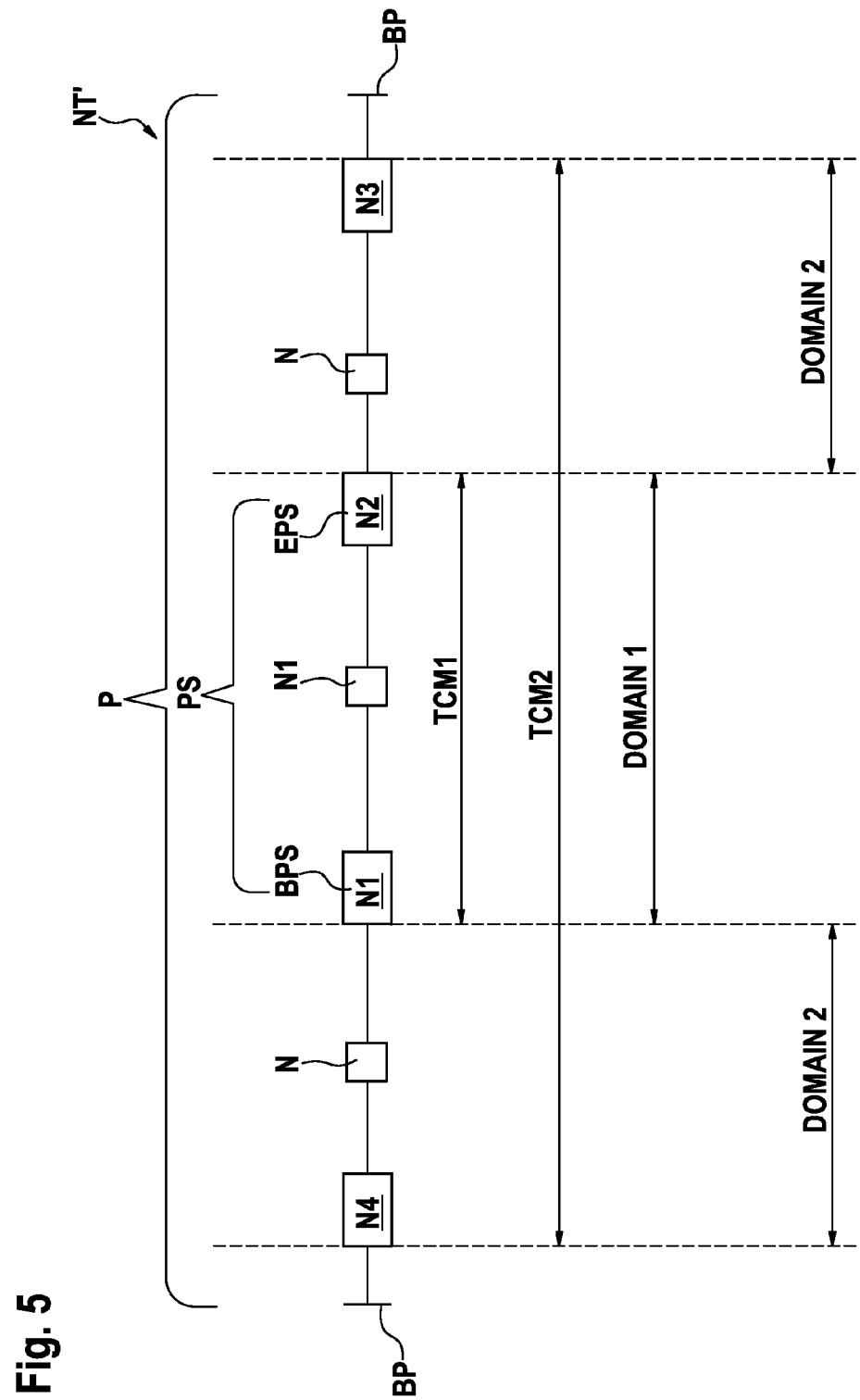
FIG. 5 shows the network nodes as well as an assignment of the network nodes to different network domains.

FIG. 5 shows network nodes of a network NT' placed along a transmission path P. The network NT' shown in FIG. 5 is in general the same as the network NT shown in FIG. 1, but contains furthermore a network node N4 that is located after the beginning BP of the transmission path P and before the beginning BPS of the path segment PS. The network node N4 performs a tandem connection monitoring source function, while the network node N3 performs a tandem connection monitoring sink function that corresponds to the source function of the network node N4. Thus, the network nodes N4, N3 perform a tandem connection monitoring layer function TCM2 between them for monitoring the transmission of the data signal between them.

The network nodes N1, N2 perform a tandem connection monitoring layer function, as previously described above, which is indicated in FIG. 5 as a tandem connection monitoring layer function TCM1.

For performing the different tandem connection monitoring functions TCM1, TCM2, the overhead of the data signal contains multiple tandem connection monitoring fields. Each tandem connection monitoring function TCM1, TCM2 is assigned an individual tandem connection monitoring field within the overhead.

The network node N3 is able to detect a failure occurring between the network node N4 and itself by performing the tandem connection monitoring sink function of the tandem connection monitoring layer function TCM2. According to an alternative solution, the network node N3 concludes that a failure occurred between the network node N4 and itself, in the case that a received data signal contains within its payload only ones, indicating the presence of an alarm signal.

The network node N3 analyzes information provided by the overhead subfields OHF1, OHF2 as previously described above, for determining whether a detected failure occurred within the path segment PS or outside of the path segment PS.

The network nodes N1, N, N2, which are located within the path segment PS, belong to a network domain DOMAIN 1 as indicated in FIG. 5. Other network nodes N3, N4, N, which are located along the transmission path P between the network nodes N4, N3, but which do not belong to the network domain DOMAIN1, belong to another network domain DOMAIN 2, as indicated in FIG. 5.

By being able to derive whether a detected failure occurred within the path segment PS or not, the network node N3 is able to decide whether upon detection of a failure protection and/or restoration actions have to be carried out within the DOMAIN 1 or within the DOMAIN 2. The network node N3 initiates protection and/or restoration within the DOMAIN 2 only in the case that the failure was determined not to have occurred within the path segment PS.

According to a further embodiment, the transmitted data signal is an optical data unit (ODU) as proposed by the standard ITU-T G.709/Y.1331 (March 2003), briefly called G.709. An ODU contains an overhead called optical data unit overhead (ODU Overhead), as well an optical payload unit (OPU). An OPU contains payload data and an optical payload overhead (OPU Overhead).

The data signal in the form of an ODU is transported within a data signal called optical transport unit (OTU). An OTU contains furthermore additional overhead called OTU Overhead, as well as a Frame Alignment Overhead. The frame alignment overhead The overall structure OTU-OH of overhead information contained in an OTU can be found in G.709 in section 15.8.1, and is shown in FIG. 6. The overhead OTU-OH consists of the Frame Alignment Overhead, the OTU Overhead, the OPU Overhead and further fields, which belong to the ODU Overhead ODU-OH.

The ODU Overhead ODU-OH contains six different fields for storing parity information of six different tandem connection monitoring layer functions. These fields are marked within the overhead ODU-OH as the fields TCM1, TCM2, TCM3, TCM4, TCM5, TCM6. Thus, the overhead ODU-OH supports up to six different tandem connection monitoring layers. Furthermore, the overhead ODU-OH contains fault type/fault localization overhead bytes which are stored within a field marked as FTFL. This field FTFL is described in the standard G.709 within the section 15.8.2.5.1.

The standard G.709 does not propose to use all of the possible bytes within the field FTFL, but leaves a number of bytes free to be used for other purposes. As described in the standard G.709, section 15.6.2.2, a data signal may span multiple frames of OTUs. Such signals require multiframe alignment processing to be performed, in addition to the usual OTUk/ODUk frame alignment. Within the OTUk Overhead OUT-OH, a byte within the Frame Alignment Overhead in row1, column7 is reserved for enabling multiframe alignment. The value of this byte is incremented each OTUk/ODUk frame and provides as such a 256-frame multi-frame. Since the field FTLF of one frame contains one byte, all FTFL fields of a 256-frame mulit-frame contain 256 bytes. A structure of the multi-frame structure of the field FTFL is shown in FIG. 7 in detail.

Figure 7:
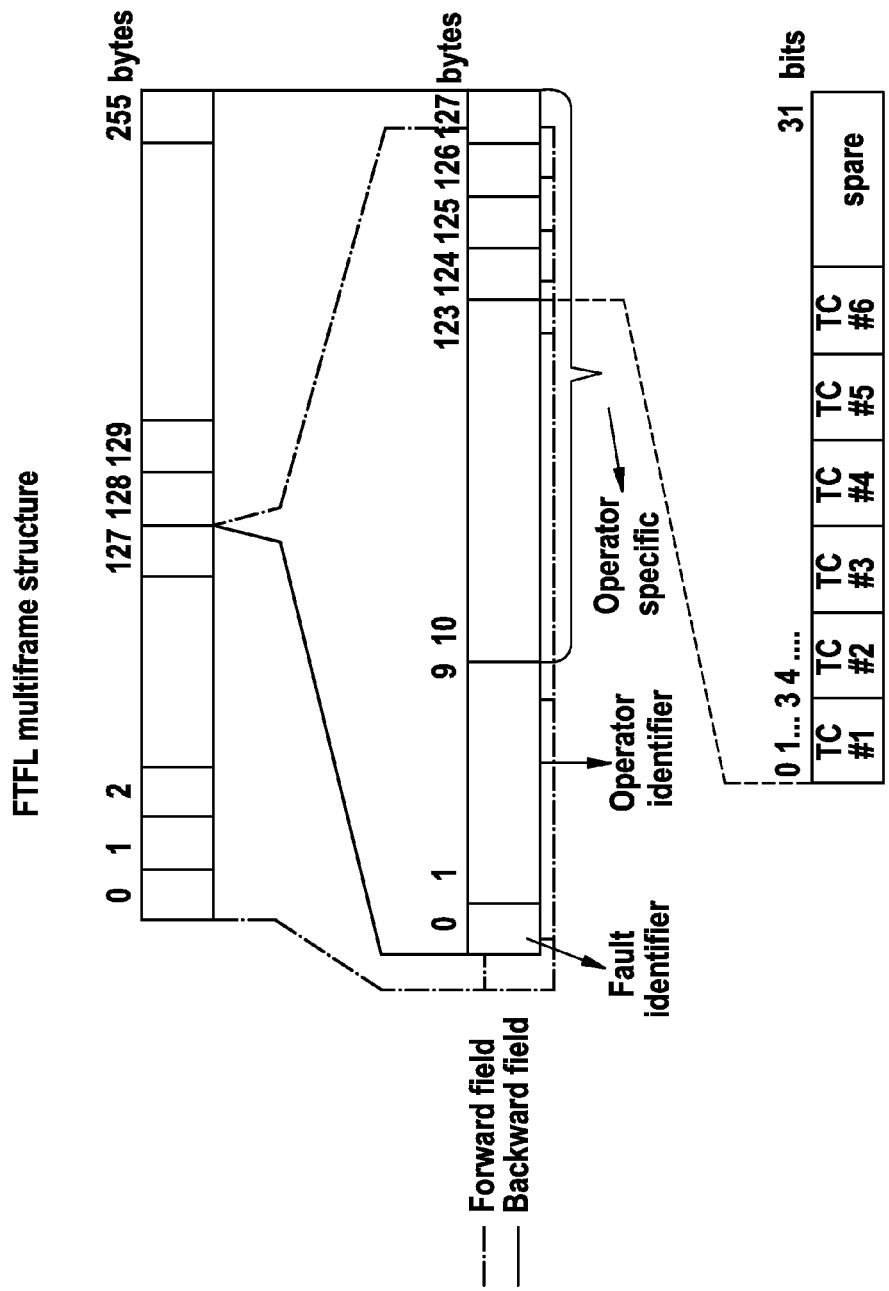
FIG. 7 shows an allocation of overhead bytes.

FIG. 7 illustrates, that the multi-frame structure of the field FTFL contains 256 bytes. Out of these 255 bytes, the last four bytes are used for carrying information indicating a failure of a data signal or indicating a failure of a tandem connection. Four different bytes provide 32 bits which are indexed within FIG. 7 as the bits 0 up to 31. Out of these 32 bits, 24 bits are used for storing the appropriate information for six different path segments monitored by six different tandem connection monitoring functions. A first overhead field TC#1 is made up of the bits 0 to 3 for storing the appropriate information with regard to a first path segment. Further overhead fields TC#2 are used to TC#6 store the appropriate information with regard to further path segments monitored by further tandem connection monitoring functions. The bits 24 to 31 are not used and kept as spare bits.

Figure 8:
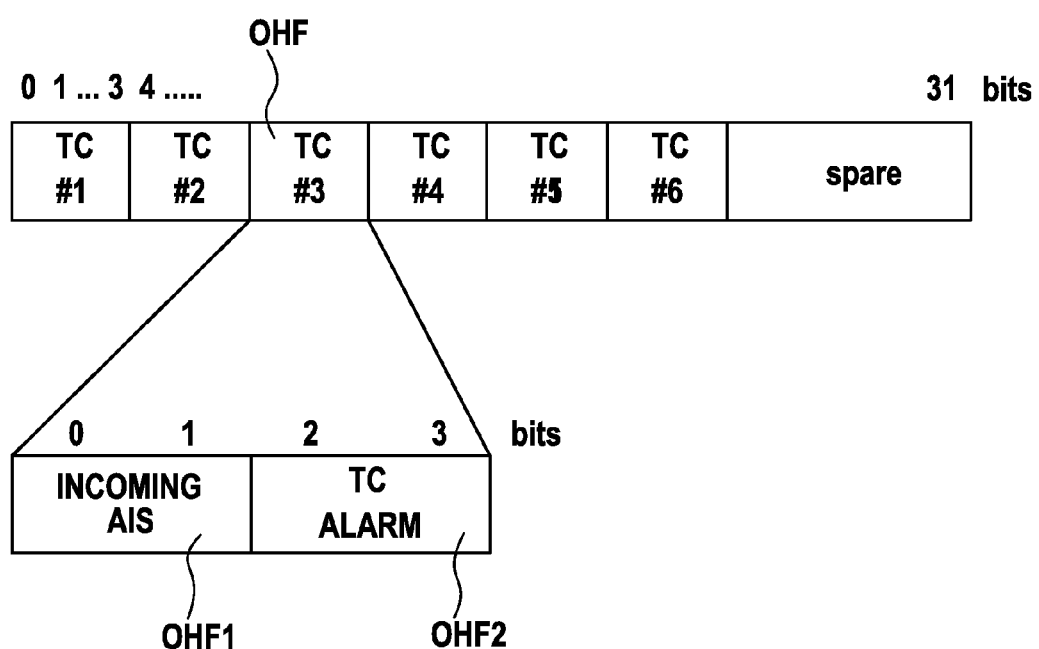
FIG. 8 shows an allocation of overhead bytes to different path segments.

FIG. 8 illustrates the detailed structure of the overhead field TC#3 as an example. The field TC#3 contains a first overhead subfield INCOMING AIS made up of two bits 0, 1 and a further overhead subfield TC ALARM made up of two further bits 2, 3. In the case, that a network node at a beginning of a path segment detects a failure of a data signal, the network node enters into the corresponding overhead subfield INCOMNIG AIS the bit pattern '01', which represents a one. In the case, that a network node located at the end of a path segment detects a failure of a tandem connection, the network node enters into the corresponding overhead subfield TC ALARM the bit pattern '01', which represents a one.

The network nodes N, N1, N2, N3 detect a failure of a data signal, as described in the telecommunication standard ITU-T G.798 (December 2006), briefly called G.798, within the section 14.2 and 14.5, by carrying out monitoring of the received data signal and deriving from fault conditions that a failure of the data signal is present.

An alarm signal in the form of a data signal is generated as described in G.709 in section 16.5.1. Such an alarm signal is from its structure the same as the transmitted data signal, but contains within its payload only ones and within its overhead also only ones, except for the fields Frame Alignment Overhead, OTUk Overhead and the field FTFL.

Figure 9:
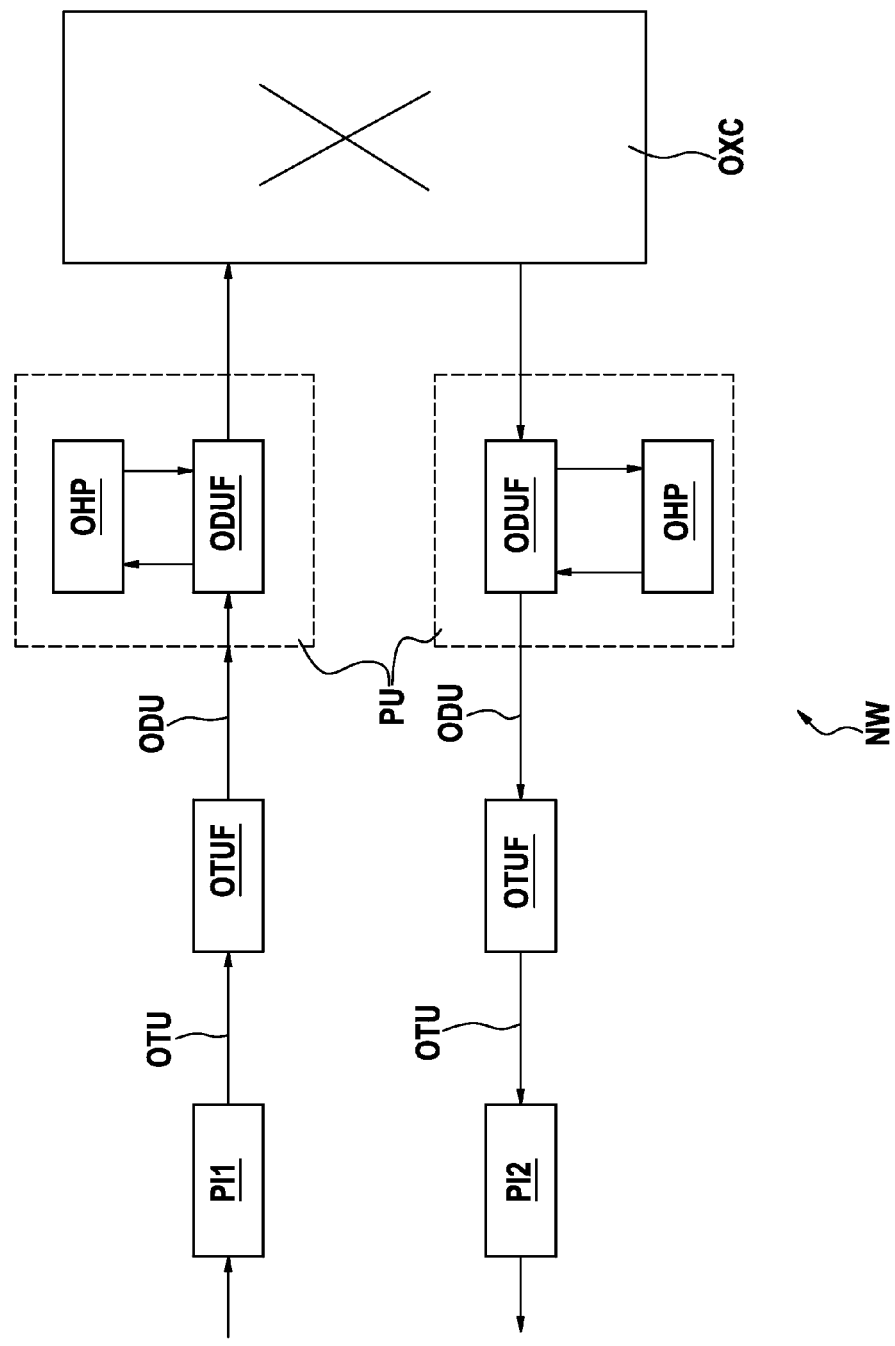
FIG. 9 shows hardware elements of a network node.

FIG. 9 shows the general structure of a network node NN. The network node NN contains a physical interface PI1 for receiving a data signal in the form of an optical transport unit (OTU), as described in the telecommunication standard G.709.

Furthermore, the network node NN contains an OTU framer OTUF for obtaining from an optical transport unit OTU an optical data unit ODU. Furthermore, the network node NN contains a processing unit PU, which processes the optical data unit ODU. Within the processing unit PU, an ODU framer ODUF and an ODU overhead processor OHP is contained. The ODU framer passes on an optical data unit to an optical switching matrix OXC. From the optical switching matrix OXC, a data signal path is established by switching an incoming optical data unit coming from a processing unit to a further processing unit PU.

The processing unit PU contains an ODU framer ODUF and an optical data unit overhead processor OHP. The ODU framer ODUF passes on an optical data unit ODU to an OTU framer OTUF, which then passes on an optical transport unit OTU to the physical interface PI2 for sending the data signal.

Figure 10A:
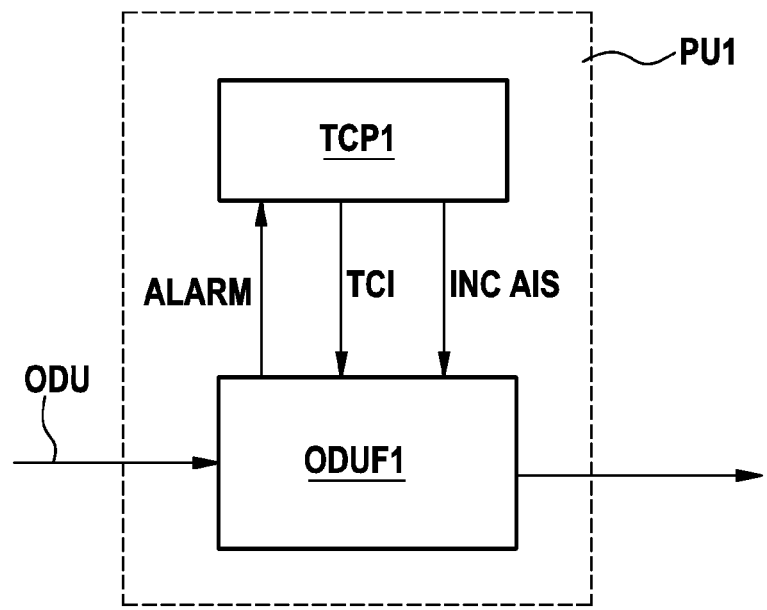
FIGS. 10a, 10b shows elements of processing units which contained within network nodes.

The general structure of a processing unit PU1 of a network node located at a beginning of a path segment is illustrated in detail in FIG. 10a. FIG. 10a shows, that an ODU framer ODUF1 exchanges information with a tandem connection processor TCP1, which is contained within the overhead processor OHP shown in FIG. 9. The ODU framer ODUF1 complies with the standard G.798. The ODU framer ODUF1 monitors the received data signal ODU and is configured such, that in case that the payload of the data signal ODU contains only ones, indicating an alarm signal which is equal to a data signal failure, the ODU framer ODUF1 indicates the reception of the alarm signal to the tandem connection processor TCP1, by providing appropriate alarm information ALARM. The ODU framer ODUF1 furthermore monitors the received data signal, and derives from conditions, which are described in the telecommunication standard G.798 within the section 14.2 and 14.5. in detail, whether a data signal failure is present. If a data signal failure is present, the ODU framer ODUF1 indicates this to the tandem connection processor TCP1 via the alarm information ALARM.

In case of receiving alarm information ALARM, indicating a data signal failure, the tandem connection processor TCP1 writes information INC AIS, indicating a data signal failure, into the overhead of the data signal ODU.

The tandem connection processor TCP1 performs furthermore a tandem connection monitoring sink function, by computing parity information TCPI over the payload of the data signal ODU and writing this parity information TCPI into the overhead of the data signal ODU.

Figure 10B:
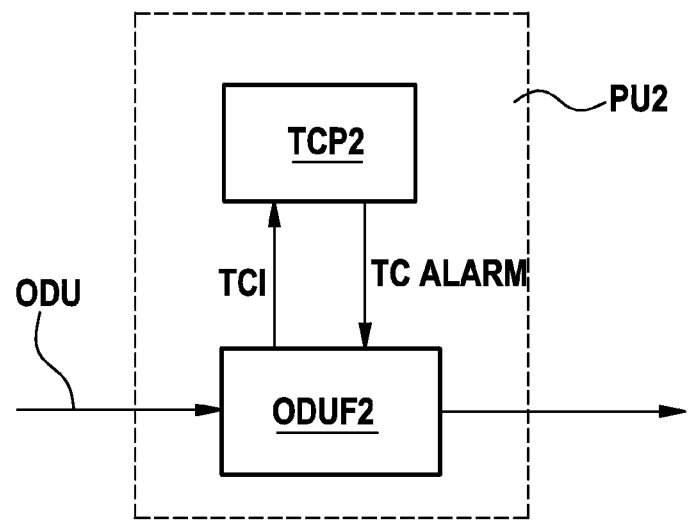

The general structure of a processing unit PU2 of a network node located at an end of a path segment is illustrated in detail in FIG. 10b. FIG. 10b shows, that an ODU framer ODUF2 exchanges information with a tandem connection processor TCP2, which is contained within the overhead processor OHP shown in FIG. 9. The ODU framer ODUF2 complies with the standard G.798. The ODU framer ODUF2 extracts tandem connection parity information TCI from the overhead of the data signal ODU and provides this information TCI to the tandem connection processor TCP2.

The tandem connection processor TCP2 computes further parity information over the payload of the data signal ODU. In the case, that the computed parity information is not equal to the provided parity information TCI, or in the case that the provided parity information contains a bit pattern of only ones, the tandem connection processor TCP2 concludes that a failure of the tandem connection is present. Thus, the tandem connection processor TCP2 writes information TC ALARM indication a failure of a tandem connection into an overhead field of the data signal ODU.

Figure 11:
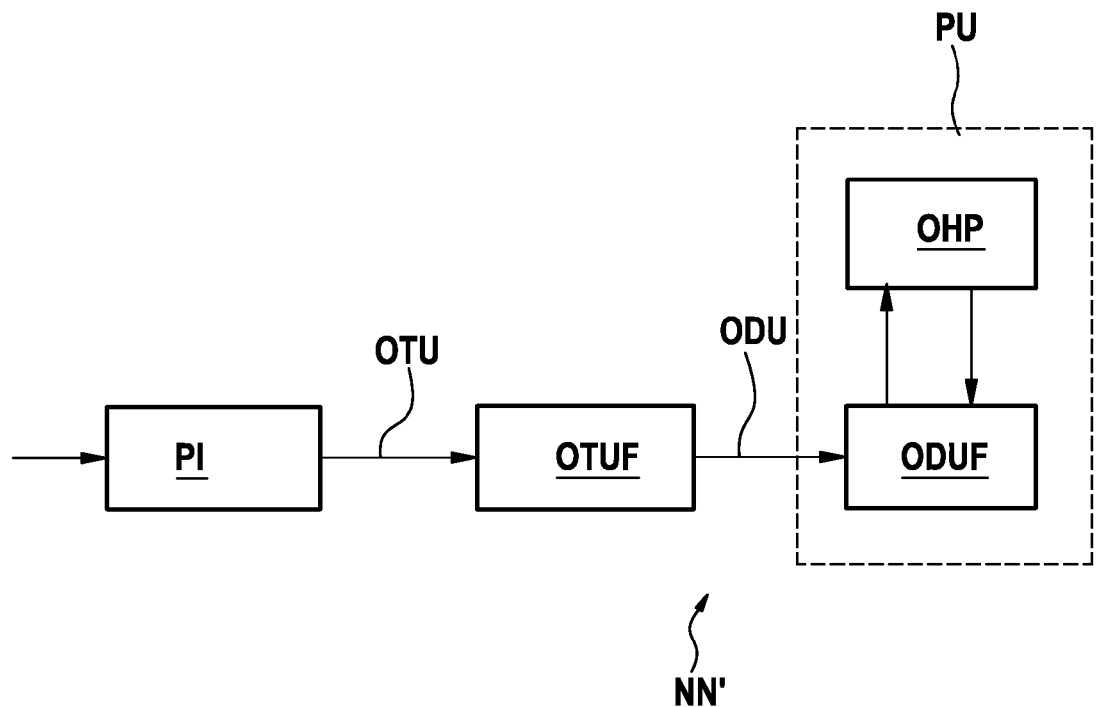
FIG. 11 shows a network node.

A network node NN' located after a path segment is shown in FIG. 11. The network node NN' contains an interface PI for receiving an optical transport unit OTU. An OTU framer OTUF retrieves from the OTU an optical data unit ODU and passes the ODU on to a processing unit PU. The processing unit PU contains an ODU framer ODUF and an overhead processor OHP. The ODU framer ODUF complies with the standard G.798. The ODU framer ODUF extracts overhead information from the overhead of the ODU.

The ODU framer ODUF monitors the received data signal ODU and is configured such, that in case that the payload of the data signal ODU contains only ones, indicating an alarm signal which is equal to a data signal failure, the ODU framer ODUF concludes that a transmission failure is present. The ODU framer ODUF furthermore monitors the received data signal, and derives from conditions, which are described in the telecommunication standard G.798 within the section 14.2 and 14.5. in detail, whether a transmission failure is present.

The overhead processor determines from information contained in the overhead of the data signal ODU, whether a detected transmission failure occurred within a path segment or outside of a path segment.

The invention claimed is:

1. A method of localizing a failure occurring along a transmission path, comprising the steps of:
    transmitting a data signal comprising an overhead along said transmission path, wherein said transmission path comprises a path segment, wherein said overhead comprises a tandem connection monitoring field reserved for a tandem connection monitoring layer;
    at a first network node located at a beginning of said path segment, performing a tandem connection monitoring source function of a first tandem connection monitoring layer;
    at a second network node located at an end of said path segment, monitoring said transmission along said path segment by performing a tandem connection monitoring sink function of said first tandem connection monitoring layer, wherein said first and said second network node perform said tandem connection monitoring source and sink functions using said tandem connection monitoring field;
    providing in said overhead furthermore an overhead field assigned to said path segment, wherein said overhead field comprises a first and a second overhead subfield;
    at said first network node, in case of detection of a failure of said data signal occurring before said path segment, entering information indicating a data signal failure into said first overhead subfield;
    at said second network node, in case of detection of a failure by said tandem connection monitoring sink function, entering information indicating a tandem connection failure into said second overhead subfield;
    at a third network node located in said transmission path and downstream from said second network node, in case of detecting a failure of said data signal occurring along said transmission path, using information contained in said first and said second overhead subfield for determining whether or not said detected failure occurred within said path segment;
    at a fourth network node located before said path segment, performing a second tandem connection monitoring source function of a second tandem connection monitoring layer, wherein said second tandem connection monitoring layer is different from said first tandem connection monitoring layer; and
    at said third network node, detecting said failure of said data signal occurring along said path by performing a second tandem connection monitoring sink function of said second tandem connection monitoring layer.

2. The method according to claim 1,
    wherein said first and said second network node belong to a first network domain; and
    wherein said third and said fourth network node belong to a second network domain;
    further comprising the step of:
    at said third network node, in case of detection of at said third network node a failure of said data signal occurring along said transmission path, initiating a protection switching function and/or restoration of said transmission path within said second network domain only if said first overhead subfield contains information that indicates a data signal failure; and
    said second overhead subfield contains information that indicates no tandem connection failure.

3. A network, comprising:
    a first network node located at a beginning of a path segment;
    a second network node located at an end of said path segment;
    a third network node located downstream from said second network node and in a transmission path comprising said path segment; and
    a fourth network node in said transmission path and located before said path segment, wherein:
    said first network node performs a tandem connection monitoring source function of a first tandem connection monitoring layer;
    said second network node monitors a data signal along said path segment by performing a tandem connection monitoring sink function of said first tandem connection monitoring layer, wherein said first and said second network nodes perform said tandem connection monitoring source and sink functions using a tandem connection monitoring field in an overhead of said data signal, said overhead having an overhead field comprising a first and second overhead subfield;
    said first network node, in case of detection of a failure of said data signal occurring before said path segment, enters information indicating a data signal failure into said first overhead subfield;
    said second network node, in case of detection of a failure by said tandem connection monitoring sink function, enters information indicating a tandem connection failure into said second overhead subfield;
    said third network node, in case of detecting a failure of said data signal occurring along said transmission path, uses information contained in said first and said second overhead subfield for determining whether or not said detected failure occurred within said path segment;
    said fourth network node performs a second tandem connection monitoring source function of a second tandem connection monitoring layer, wherein said second tandem connection monitoring layer is different from said first tandem connection monitoring layer; and
    said third network node, detects said failure of said data signal occurring along said transmission path by performing a second tandem connection monitoring sink function of said second tandem connection monitoring layer.

4. The network of claim 3,
wherein said first and said second network nodes belong to a first network domain;
wherein said third and said fourth network nodes belong to a second network domain; and wherein
said third network node, in case of detection of a failure of said data signal occurring along said transmission path, initiates a protection switching function and/or restoration of said transmission path within said second network domain only if said first overhead subfield contains information that indicates a data signal failure; and
said second overhead subfield contains information that indicates no tandem connection failure.

\* \* \* \* \*